Nov. 3, 1936.    P. A. KINZIE    2,059,366
TORQUE MECHANISM
Filed June 11, 1935    2 Sheets-Sheet 1

INVENTOR.
Phillip A. Kinzie
BY
ATTORNEY.

Nov. 3, 1936.          P. A. KINZIE              2,059,366
                       TORQUE MECHANISM
              Filed June 11, 1935        2 Sheets-Sheet 2

INVENTOR.
Phillip A. Kinzie
BY
ATTORNEY.

Patented Nov. 3, 1936

2,059,366

UNITED STATES PATENT OFFICE 2,059,366

TORQUE MECHANISM

Phillip A. Kinzie, Denver, Colo., assignor to Universal Hydraulic Corporation, Denver, Colo., a corporation of Colorado Application June 11, 1935, Serial No. 26,016

2 Claims. (Cl. 192—150)

This application relates to a geared torque unit which may be either electrically or manually operated.

More particularly the invention has reference to a torque mechanism adapted to operate devices wherein a definite amount of rotation in one direction, and a corresponding amount of rotation in a reverse direction is required for operation of a driven element.

And a still further feature is a torque unit, actuated by electrical means, and operated through bevel, worm, and planetary gearing elements; said gearing elements being protected by a spring-loaded built-in clutch element.

Another object of the invention is a torque unit actuated by manual means, wherein the aforementioned gearing elements are energized for operation by an auxiliary pinion and handwheel, the latter readily accessible from the exterior of the encasing members; and, further, said handwheel is locked to prevent rotation while the unit is being electrically operated.

This invention also has as an object, the combination, in a torque unit, of a differential element wherein a planetary system of gearing is operated either by locking the ring gear member stationary and rotating the central pinion, or is operated by retaining the central pinion stationary and rotating the ring gear member.

This invention has as still another object, the combination in a torque unit of an electrical controlling means, actuated by auxiliary elements directly connected with the aforementioned operating means, and with said electrical controlling means un-affected by manual operation of the unit.

An additional feature is the means whereby all driving gearing, as well as the clutch element, operates in a bath of oil.

Also, while this unit is to be electrically operated under normal conditions, the invention further contemplates manual operation in the event of power failure; further, this manual operating means is so arranged that its use does not in any way affect the electrical controlling means, and when electrical energy is again available, the unit will not require servicing for the resumption of electrical operation.

The torque mechanism of the present invention is especially suitable to the control and operation of by-pass needle valves, or other hydraulic valves such as are illustrated in the application entitled "Hydraulic rotor operated valve" Serial No. 660,284, filed March 10, 1933, and while such adaptations are mentioned as specific examples of application of torque units of the type of this present invention, nevertheless, it is to be understood that the field of usefulness is not restricted to this character of service. Torque units of this type are applicable to gate valves, plug valves, butterfly valves, etc.; and since the unit is fully automatic, it may also be readily applied as a controlling and operating means for many types of automatic processes and machinery.

With the foregoing in view there will now be described specific embodiments of the invention, for the purpose of satisfying the patent statutes, and which have been illustrated in the accompanying drawings forming a part hereof, and wherein.

Figure 1:
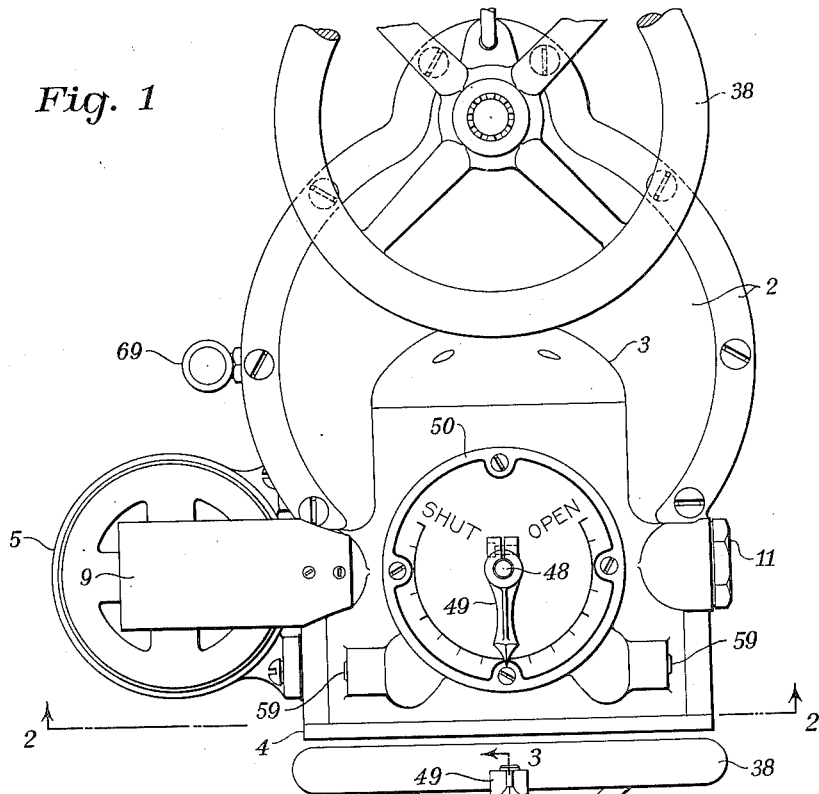
Fig. 1 is a plan view of the unit.
Figure 3:
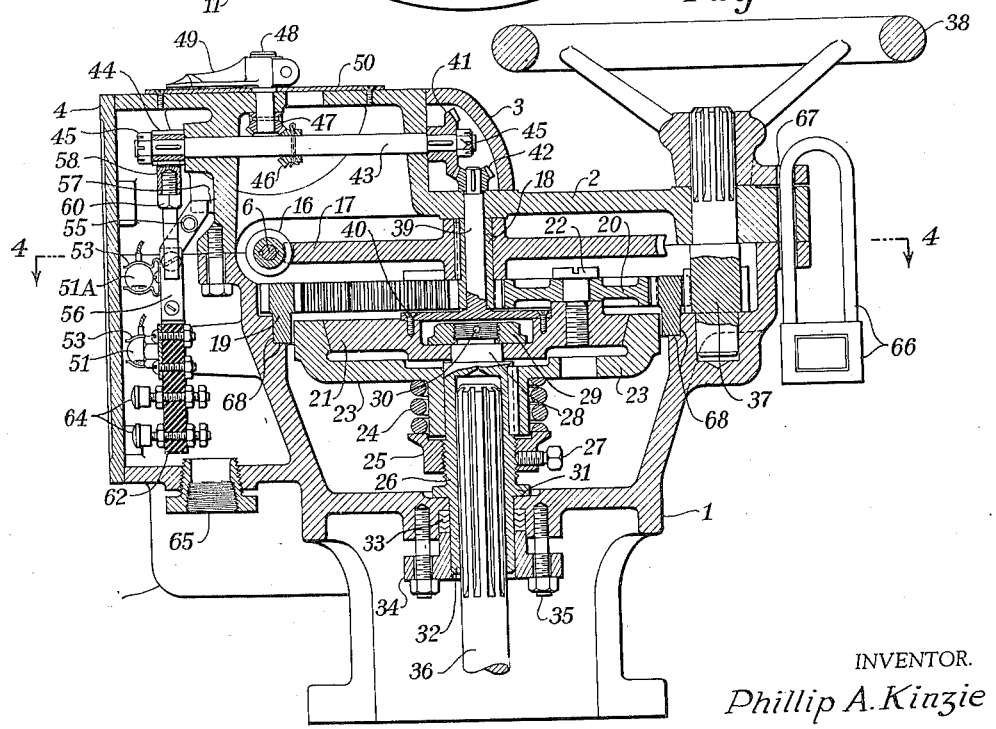
Fig. 3 is a sectional view on the plane 3—3 of Fig. 2.

By examining the accompanying drawings, particularly Fig. 3, it will be observed that the gear case 1, together with the gear case cover 2, bevel gear cover 3 and limit switch cover 4 house, retain, and support all of the elements of the torque unit. The motor 5, which is supported on the gear case 1, provides the electrical actuating means, and is geared to the worm shaft 6 through the bevel pinion 7 and bevel gear 8 which are keyed to the motor and worm shafts respectively. A protecting guard 9, Fig. 1, is placed over this set of gearing.

Figure 4:
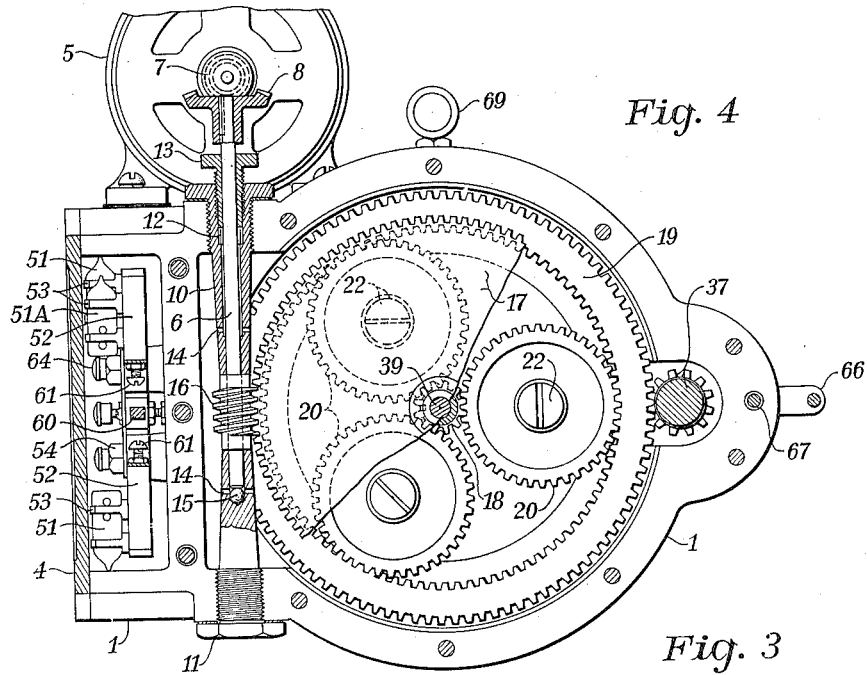
Fig. 4 is a sectional view on the plane 4—4 of Fig. 3.

The worm shaft 6 is journaled in the worm bearings 10 and 11, Fig. 4, which are threaded into the gear case 1 and gear case cover 2. The packing 12, which is retained by the threaded gland 13, prevents escape of oil from the interior of the case. The oil holes 14 allow oil to enter and lubricate the worm shaft 6 in the bearings 10 and 11. The ball 15 receives the thrust of the worm 16, which is tightly keyed to the worm shaft 6. The worm gear 17 meshes with the worm 16 and has in keyed engagement, the extended hub of the planetary pinion 18, Fig. 3. Meshing with the planetary pinion 18 and the internal teeth on the ring gear 19, are three planetary gears 20 which are mounted on the clutch cone 21, Fig. 3, and rotatably secured thereon by the screws 22. The clutch cup 23 is held in frictional engagement with the clutch cone 21 by the spring 24. The nut 25, which is threaded on the drive shaft 26, makes possible the adjustment of the compression on the spring 24, and is provided with the set screw 27 which maintains the nut 25 in the adjusted position. The upwardly extending portion of the drive shaft 26 is received within and is in keyed engagement with the hub of the clutch cup 23. The turned hub 28 which extends into the mating bore in the clutch cone 21 centralizes the two members of the clutch element while the nut 29 which is threaded to the top of the drive shaft 26 and locked thereon by the pin 30 permits the compression of the spring 24 to become effective between the cup and cone members of the clutch element. The shoulder 31 on the drive shaft 26 takes the axial thrust due to the weight of the gearing, clutch members, etc., to be transferred to the case, while the downwardly extending hub 32 centralizes the aforementioned members. The extending hub 32 is rendered oil tight by the packing 33 which is retained by the gland 34 and the studs 35. An upwardly extending internal spline in the drive shaft 26 receives the stem 36 which connects to the driven element.

The pinion 37 which meshes with the external teeth on the ring gear 19 has the upwardly extending spline which is matingly received within the hub of the handwheel 38.

Interconnection between the integral electrical control switches is secured by attaching the flanged spindle 39 to the clutch cone 21 with the screws 40. In addition to transmitting the rotation of the drive unit to the bevel gear 41 through the bevel pinion 42, the spindle 39, since it is journaled in the gear case cover, provides an upper centralizing element for the gearing, clutch, etc. The line shaft 43 to which the bevel gear 41 is keyed has the rack pinion 44 keyed to the outwardly extending end; both gears being retained by the slotted nuts 45. The set of miter gears 46 and 47 transmit the rotation of the line shaft 43 to the stub shaft 48 to which the pointer 49, Figs. 1 and 3, is clamped. Graduations on the dial plate 50 which is attached to the gear case cover 2 provide direct mechanical indication for this unit.

Figure 2:
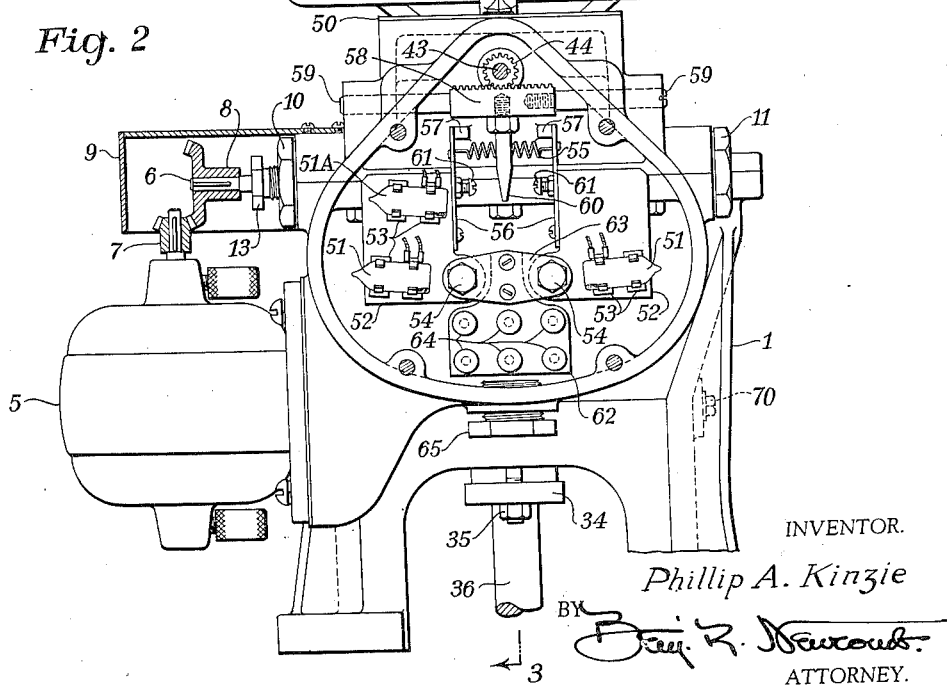
Fig. 2 is a sectional view taken substantially on the plane 2—2 of Fig. 1.

Automatic electric control for the unit is provided by tipping the mercury switches 51, Fig. 2, which are mounted on the blocks 52 and retained thereon by the clips 53. The mounting blocks 52 are pivoted on the cap screws 54, and are held in a vertical position by the spring 55 which brings the stop plates 56 to bear against the stop lugs 57 on the gear case cover 2. The rack 58 which meshes with the rack pinion 44 has the extended pins 59 which enter mating bores in the gear case cover 2. Rotation of the rack pinion 44 causes the rack to slide laterally; thus bringing the trip stud 60 into contact with the adjustable screws 61 thereby tipping the blocks and the mercury switches 51, which are mounted thereon. The alternate tipping of these switches as the rack moves back and forth during the cycles of operation of the control unit provides the automatic electrical control of the motor 5.

A terminal block 62, mounted on the plate 63 and supported on the cap screws 54, has the binding posts 64 which receive the pigtails from the mercury switches and the lead wires for the controlling and actuating elements. The bushing 65, which is screwed into the gear case, has an internal thread which receives a conduit through which the lead wires enter the gear case 1.

With the mechanics of the invention in mind, an operating cycle for both electric and manual control will now be described.

For an electrical operating cycle, contact is made with the motor through one mercury switch 51, Fig. 2, causing rotation of the motor shaft. This rotation is transmitted to the worm shaft 6, Figs. 3 and 4, and worm 16 through the bevel gears 7 and 8, causing rotation of the worm gear 17 and the integrally keyed planetary pinion 18 which in turn rotates the planetary gears 20; driving them around the internal gearing on the ring gear 19, thereby imparting a rotative force on the clutch cone 21 through the screws 22. The rotation of the clutch cone 21 is transmitted to the clutch cup 23; thence to the drive shaft 26 and the stem 36 which is connected to a driven element. When the drive shaft 26 has rotated the prescribed number of turns, the mercury switch 51 will be tipped, through the agency of the gearing and in a manner which has been previously described, thus breaking the electrical circuit and stopping the motor 5. By reversing the direction of rotation of the motor shaft the corresponding reverse cycle is executed with the opposite mercury switch stopping the motor. The third mercury switch 51A, while it is not necessary to the operation of the unit itself, is provided for allowing a secondary electrical circuit to be interconnected for controlling other units, operated in series with this unit or to allow electrical indication of the position of this unit.

It will be noted that the ring gear 19, Fig. 3, is held stationary during electrical operation by the pinion 37 which is in mesh with the external teeth on the ring gear 19, and is locked against rotation by the lock 66 which extends through a hole 67 in a lug on the hub of the handwheel 38 and into a mating hole through the gear case 1 and gear case cover 2.

For manual operation of the unit the lock 66 is removed, then by rotating the handwheel 38, the pinion 37 will cause the ring gear 19 to rotate within the counterbore 68 in the gear case 1, Fig. 3. Rotation of the ring gear 19 will cause the planetary gears to travel around the planetary pinion 18 which is held stationary by the self-locking feature effected by worm gearing. As the planetary gears 20 travel around the pinion, their rotative force will be transmitted to the clutch cone 21 and drive shaft 26 in same manner as during electrical operation.

It will be noted that the spindle 39 also turns during manual operation; hence, when electrical operation is resumed the mercury switches 51 will be tipped in the proper relation with respect to the position of the controlled element, and therefore will not require servicing or readjustment.

Lubricating oil is introduced into the unit through the cup 69, Figs. 1 and 4, while the drain plug 70, Fig. 2, provides the means for draining the oil from the unit; should it be desired to do so.

While in the foregoing there has been described a specific embodiment of the invention; it is, nevertheless, to be understood that in practicing the same, I may resort to any and all modifications falling within the scope of the appended claims defining the same.

I claim—

1. A torque mechanism comprising a driving and a driven member, a planetary transmission between said members, operating means, one of which engages the sun gear and the other the orbit gear of said planetary transmission and each remaining stationary when the other is operated, a friction overload declutching device between the planetary transmission and the driven member, a position indicator actuated directly by one element of the declutching device, and means enclosing at least the transmission in an oil-tight housing forming a mounting for the whole mechanism.

2. A torque mechanism comprising a driving and a driven member, a planetary transmission between said members, operating means, one of which engages the sun gear and the other the orbit gear of said planetary transmission and each remaining stationary when the other is operated, a friction overload declutching device between the planetary transmission and the driven member, a position indicator actuated directly by one element of the declutching device, limit switches actuated only from a driving element common to the indicator, and means enclosing at least the transmission in an oil-tight housing forming a mounting for the whole mechanism.

PHILLIP A. KINZIE.